United States Patent
Masumoto et al.

(10) Patent No.: US 7,633,649 B2
(45) Date of Patent: Dec. 15, 2009

(54) PRINTING APPARATUS, CONTROL METHOD THEREFOR, AND STORAGE MEDIUM

(75) Inventors: Kazuyuki Masumoto, Kanagawa (JP); Masashi Kamada, Kanagawa (JP); Kentaro Yano, Kanagawa (JP); Akitoshi Yamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 238 days.

(21) Appl. No.: 11/866,600

(22) Filed: Oct. 3, 2007

(65) Prior Publication Data

US 2008/0030754 A1 Feb. 7, 2008

Related U.S. Application Data

(62) Division of application No. 10/265,791, filed on Oct. 8, 2002, now Pat. No. 7,298,523.

(30) Foreign Application Priority Data

Oct. 9, 2001 (JP) ............................. 2001-311956

(51) Int. Cl.
 *G06F 15/00* (2006.01)
 *G06K 1/00* (2006.01)
 *H04N 1/60* (2006.01)
 *G06K 15/00* (2006.01)
 *H04N 1/40* (2006.01)
(52) U.S. Cl. ..................................... 358/1.9; 358/3.22
(58) Field of Classification Search ............... 358/1.9, 358/1.1, 1.13, 1.14, 3.02, 3.03, 3.05, 3.06, 358/3.22

See application file for complete search history.

(56) References Cited

U.S. PATENT DOCUMENTS

| 5,293,481 | A | 3/1994 | Mita et al. .................. 395/163 |
| 5,422,738 | A | 6/1995 | Ishihara et al. .............. 358/500 |
| 6,052,207 | A | 4/2000 | Takagi et al. ................ 358/452 |
| 6,058,465 | A | 5/2000 | Nguyen |

(Continued)

FOREIGN PATENT DOCUMENTS

CN          1137649         12/1996

(Continued)

OTHER PUBLICATIONS

European Search Report dated Apr. 28, 2004 (Ref. No. P202-0293EP/02022448.1-1241-).

(Continued)

*Primary Examiner*—Douglas Q Tran
(74) *Attorney, Agent, or Firm*—Fitzpatrick, Cella, Harper & Scinto

(57) ABSTRACT

A print apparatus which receives image data from a digital camera, PC card, or PC to print an image on a storage medium outputs print data based on image data from the PC to a printer engine via a USB hub, and prints an image. The apparatus has a DSP which receives compressed image data from the digital camera or PC card, decodes the received data, and parallelly executes, for the decoded image data, at least color space conversion processing, size change processing, and color conversion processing. The apparatus generates print data on the basis of the image data processed by the DSP, outputs the generated print data to the printer engine, and prints an image.

4 Claims, 18 Drawing Sheets

U.S. PATENT DOCUMENTS

| | | | |
|---|---|---|---|
| 6,115,138 A * | 9/2000 | Yanaka | 358/1.9 |
| 6,178,004 B1 | 1/2001 | Ochiai | 358/1.14 |
| 6,351,314 B1 | 2/2002 | Nakagiri | 358/1.11 |
| 6,354,752 B1 | 3/2002 | Nakagiri | 400/76 |
| 6,493,472 B1 | 12/2002 | Takagi et al. | 382/317 |
| 6,507,358 B1 | 1/2003 | Mori et al. | 348/42 |
| 6,552,743 B1 | 4/2003 | Rissman | 348/207.2 |
| 6,563,596 B1 | 5/2003 | Narushima | 358/1.14 |
| 6,570,664 B2 | 5/2003 | Nakagiri | 358/1.11 |
| 6,753,903 B1 | 6/2004 | Lin | 348/207.2 |
| 6,814,290 B2 * | 11/2004 | Longacre | 235/462.1 |
| 6,831,755 B1 | 12/2004 | Narushima et al. | 358/1.9 |
| 6,882,440 B1 | 4/2005 | Nitta | 358/1.16 |
| 7,202,975 B2 | 4/2007 | Narushima et al. | 358/1.9 |
| 2003/0067638 A1 | 4/2003 | Yano | 358/1.9 |
| 2003/0174351 A1 | 9/2003 | Kawanabe et al. | 358/1.9 |

FOREIGN PATENT DOCUMENTS

| | | |
|---|---|---|
| CN | 1152747 | 6/1997 |
| EP | 0 859 327 A2 | 8/1998 |
| EP | 0 860 980 | 8/1998 |
| EP | 0 938 041 | 8/1999 |
| EP | 0 949 804 | 10/1999 |
| EP | 1 087 607 | 3/2001 |
| EP | 1 119 177 | 7/2001 |
| JP | 60-146574 | 8/1985 |
| JP | 05-318845 | 12/1993 |
| JP | 2000-52605 | 2/2000 |
| JP | 2000-177210 | 6/2000 |
| JP | 2000-198240 | 7/2000 |
| JP | 2001-88374 | 4/2001 |
| JP | 2001-282470 | 10/2001 |
| JP | 2001-290615 | 10/2001 |
| WO | PCT/JP02/10878 | 10/2002 |

OTHER PUBLICATIONS

Chinese Official Action dated Mar. 19, 2004 (Appln. No. 02143801.3).

PCT International Search Report for PCT/JP02/10878 issued Jan. 14, 2003.

* cited by examiner

FIG. 18
| CALCULATION | $RC_0 + d_0$ | $RC_1 + d_1$ | $RC_2 + d_2$ |
  
| STORE | $R^*$ | $G^*$ | $B^*$ |
FIG. 19
COMPARISON: $R \leq 128$
|  | TRUE | FALSE |
| CALCULATION | $R - D_0$ | $R - D_1$ |
 
STORE: DIFFERENCE SIGNAL

PRINTING APPARATUS, CONTROL METHOD THEREFOR, AND STORAGE MEDIUM

CROSS REFERENCE TO RELATED APPLICATION

The present application is a divisional of U.S. application Ser. No. 10/265,791 filed Oct. 8, 2002, pending.

FIELD OF THE INVENTION

The present invention relates to a printing apparatus which receives image data from an image sensing apparatus such as a digital camera, a memory, or the like and prints the image data on a print medium, a control method therefore, and a storage medium.

BACKGROUND OF THE INVENTION

In recent years, digital cameras (image sensing apparatuses) capable of photographing an image by a simple operation and converting the image into digital image data have been widely used. To print an image photographed by this camera and use the print as a photograph, the photographed digital image data is input from the digital camera to a PC (computer), and undergoes image processing by the PC. Then, the processed data is output to a color printer, which prints the data.

To the contrary, there have been developed color print systems capable of directly transferring digital image data from a digital camera to a color printer and printing the image data by the color printer without using any PC, and so-called photo-direct (PD) printers capable of directly mounting in a color printer a memory card which is mounted in a digital camera and stores a sensed image, and printing the photographed image stored in the memory card by the color printer.

In such a conventional printer apparatus, a CPU which controls the entire apparatus executes processing, which requires a long time, e.g., image processing such as decoding/expansion and color conversion of received image data. This prolongs a time required for the processing, resulting in a long time required for printing.

SUMMARY OF THE INVENTION

The present invention has been made in consideration of the above prior art, and has as its object to provide a printing apparatus capable of processing and printing input image data at a high speed, a control method of the printing apparatus, and a storage medium.

It is another object of the present invention to provide a printing apparatus which can selectively print image data from a plurality of image data sources with a high efficiency and prevent an unintended image from printing even when a plurality of devices and memories are connected, a control method of the printing apparatus, and a storage medium.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 18 is a view for explaining an example of RGB color conversion processing in step S23 of FIG. 11; and FIG. 19 is a view for explaining an example of error diffusion processing in step S32 of FIG. 12.

DETAILED DESCRIPTION OF THE PREFERRED EMBODIMENT

A preferred embodiment of the present invention will be described in detail below with reference to the accompanying drawings.

Figure 1:
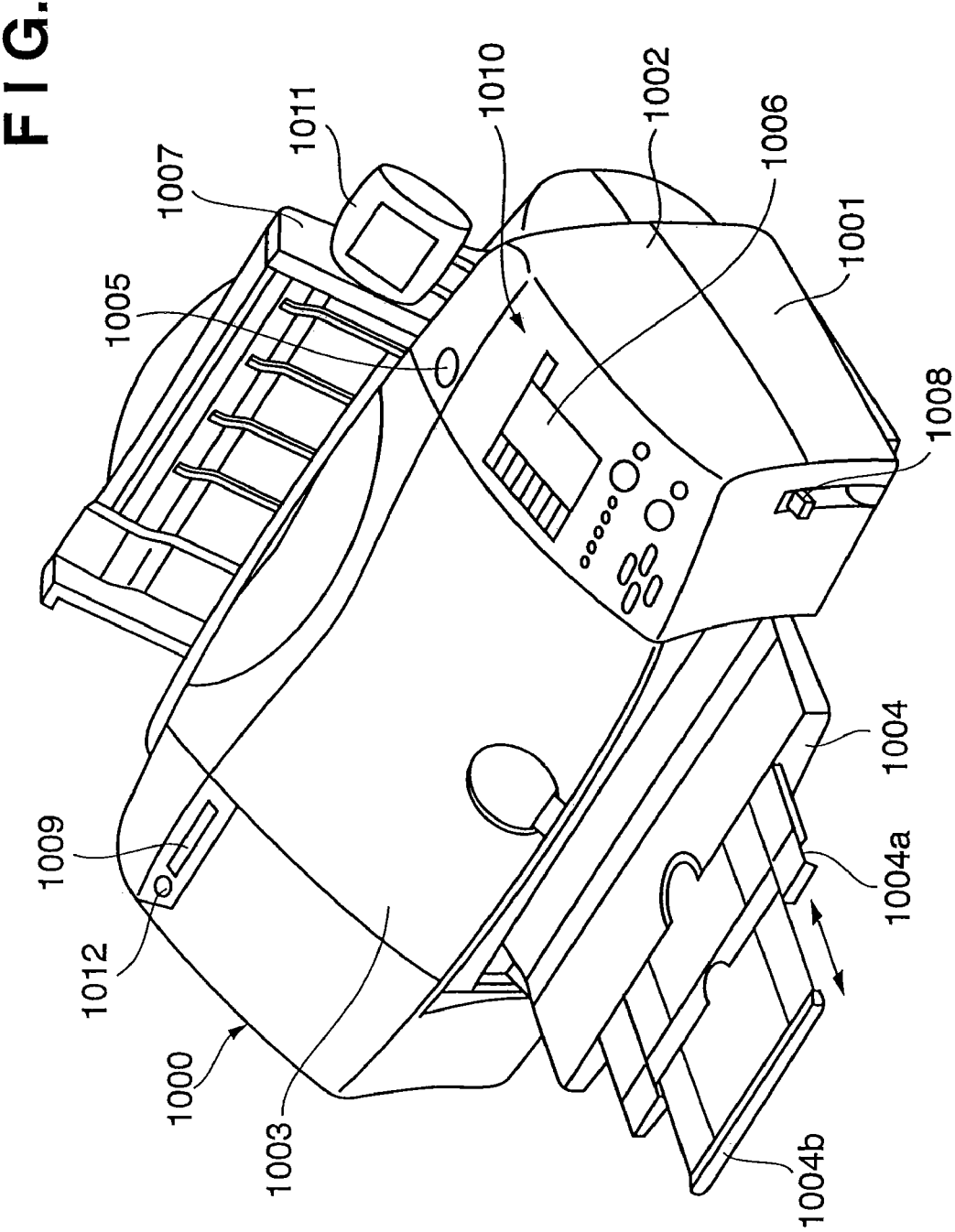
FIG. 1 depicts a schematic perspective view showing a photo-direct printer apparatus according to an embodiment of the present invention.

FIG. 1 is a schematic perspective view showing a photo-direct printer apparatus 1000 according to the embodiment of the present invention. The photo-direct printer has a general PC printer function of receiving data from a host computer (PC) and printing the data, and a function of directly reading and printing image data stored in a storage medium such as a memory card, or receiving image data from a digital camera connected to the printer apparatus and printing the data.

In FIG. 1, the main body which defines the casing of the photo-direct printer apparatus 1000 according to this embodiment has casing members: a lower case 1001, upper case 1002, access cover 1003, and discharge tray 1004. The lower case 1001 forms almost the lower half of the apparatus 1000, whereas the upper case 1002 forms almost the upper half of the main body. A combination of these cases forms a hollow structure with a storage space where each mechanism (to be described later) is accommodated. The upper and front surfaces have openings. The discharge tray 1004 is rotatably held at one end by the lower case 1001, and the opening in the front surface of the lower case 1001 is opened/closed by rotating the discharge tray 1004. To execute print operation, the discharge tray 1004 is rotated toward the front side to open the opening. Print sheets can be discharged from the opening, and the discharged print sheets can be sequentially stacked. The discharge tray 1004 houses two auxiliary trays 1004a and 1004b. These trays are selectively pulled out to enlarge/reduce the paper support area in three stages, as needed.

The access cover 1003 is rotatably held at one end by the upper case 1002 so as to open/close the opening formed in the upper surface. Opening the access cover 1003 enables exchanging a print head cartridge (not shown), ink tank (not shown), or the like accommodated in the main body. Although not shown, a projection formed on the back surface of the access cover 1003 rotates a cover opening/closing lever when the access cover 1003 is opened/closed. The lever rotation position is detected by a microswitch or the like, thereby detecting the open/closed state of the access cover.

A power switch 1005 is provided with the upper surface of the upper case 1002. An operation panel 1010 having a liquid crystal display 1006, various key switches, and the like is arranged on the right side of the upper case 1002. The structure of the operation panel 1010 will be described in detail with reference to FIG. 2. Reference numeral 1007 denotes an automatic feeder which automatically feeds print sheets into the apparatus main body; numeral 1008 denotes a paper interval selection lever for adjusting the interval between the print head and the print sheet; and numeral 1009 denotes a card slot into which an adapter capable of mounting a memory card is inserted. Image data stored in a memory card can be directly received and printed via the adapter. The memory card (PC) includes, e.g., a Compact Flash Memory™, smart media, and memory stick. Reference numeral 1011 denotes a viewer (liquid crystal display) which is detachable from the apparatus main body and is used to display an image of one frame, an index image, and the like when images stored in the PC card are searched for an image to be printed; and numeral 1012 denotes a terminal (input terminal for inputting image data) for connecting a digital camera (to be described later). A USB bus connector 1013 in FIG. 4 for connecting a personal computer (PC) is provided with the back side of the apparatus main body.

Figure 2:
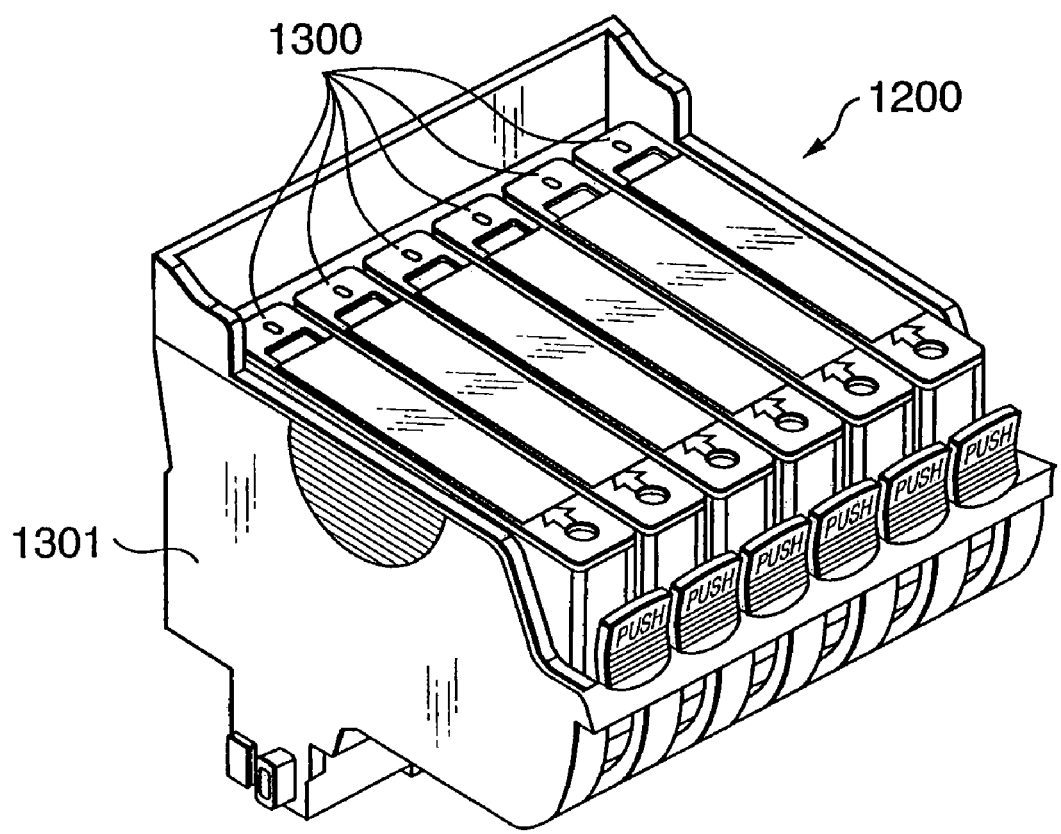
FIG. 2 is a schematic perspective view showing a print head of the photo-direct printer apparatus according to the embodiment of the present invention.

FIG. 2 is a schematic perspective view showing the arrangement of the print head of the photo-direct printer apparatus 1000 according to the embodiment.

As shown in FIG. 2, a print head cartridge 1200 in this embodiment has ink tanks 1300 which accommodates inks, and a print head 1301 which discharges inks supplied from the ink tanks 1300 from nozzles in accordance with print information. The print head 1301 employs a so-called cartridge scheme, which is detachably mounted in a carriage 1102. In printing, the print head cartridge 1200 is reciprocated and scanned along a carriage shaft, and a color image is printed on a print sheet along with the operation of the print head cartridge 1200. To achieve high-quality color printing like a photograph, for example, the black, light cyan (LC), light magenta (LM), cyan, magenta, and yellow ink tanks are independently set in the print head cartridge 1301 shown in FIG. 2. Each ink tank is detachable from the print head 1301.

In this embodiment, the apparatus using the above-described six color inks will be described. However, the present invention is not limited to this, and may be applied to an ink-jet printer which prints using four color inks, black, cyan, magenta, and yellow. In this case, each of four independent ink tanks may be detachably set in the print head 1301.

Figure 3:
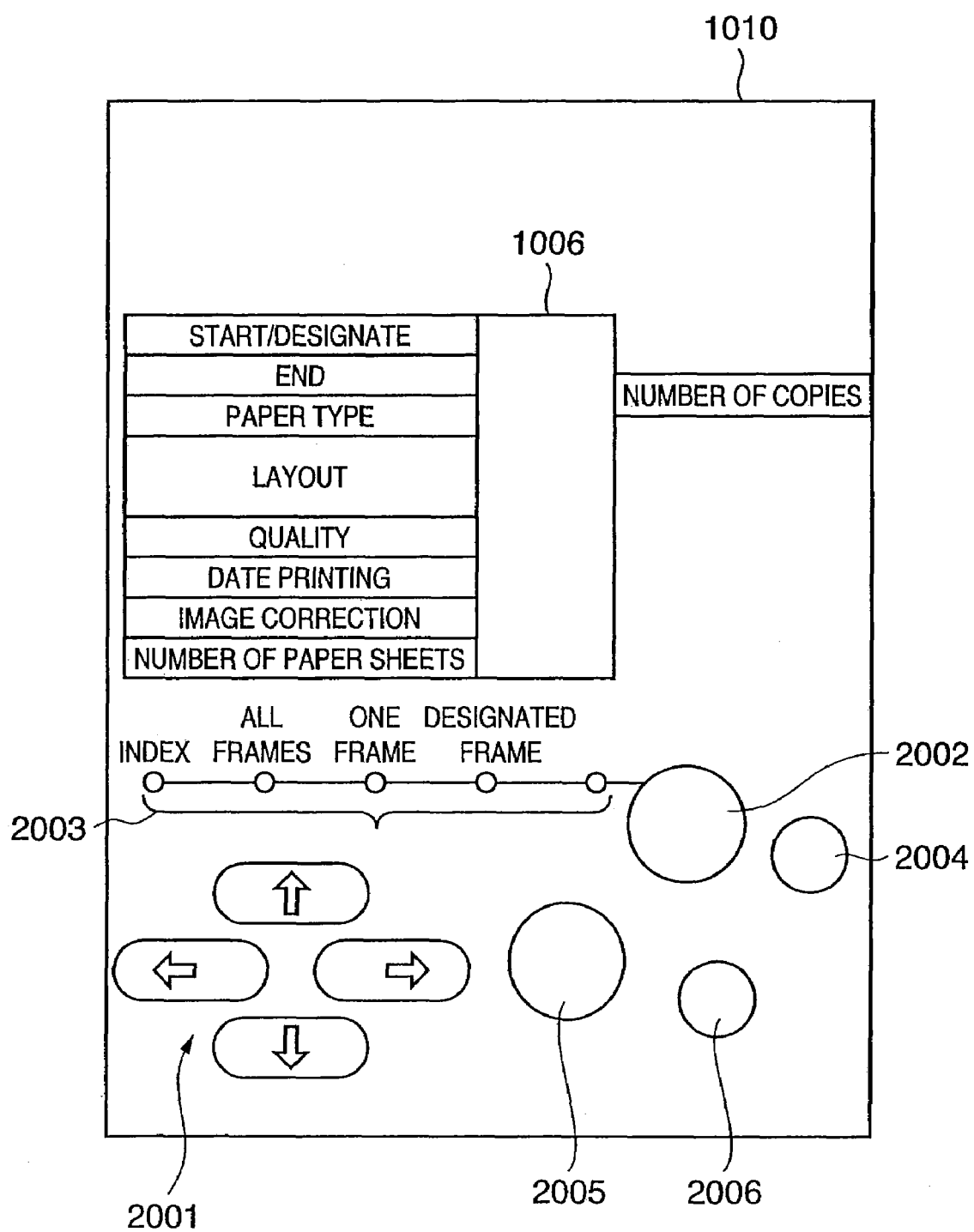
FIG. 3 is a block diagram showing the arrangement of the main part concerning control of the photo-direct printer apparatus according to the embodiment.

FIG. 3 is a schematic view showing the operation panel 1010 according to this embodiment.

In FIG. 3, the liquid crystal display 1006 displays menu items for various settings of data on items printed on the right and left of the display 1006. The displayed items are the first photograph number of a print range, a designated frame number (start/-designate), the last photograph number of the print range (end), the number of prints (number of copies), the type of paper (print sheet) used for printing (paper type), setting of the number of photographs to be printed on one paper sheet (layout), designation of the print quality (quality), designation whether to print a photographing date (date printing), designation whether to correct and print a photograph (image correction), and display of the number of paper sheets necessary for printing (number of paper sheets). These items are selected or designated with cursor keys 2001. Reference numeral 2002 denotes a mode key which allows switching the type of printing (index printing, printing of all frames, printing of one frame, or the like) every time the key is pressed; numeral 2004 denotes a maintenance key for performing printer maintenance such as cleaning of the printer head; numeral 2005 denotes a print start key which is pressed to designate the start of printing or establish maintenance setting; and numeral 2006 denotes a stop key which is pressed to stop printing or designate to stop a maintenance processing.

Figure 4:
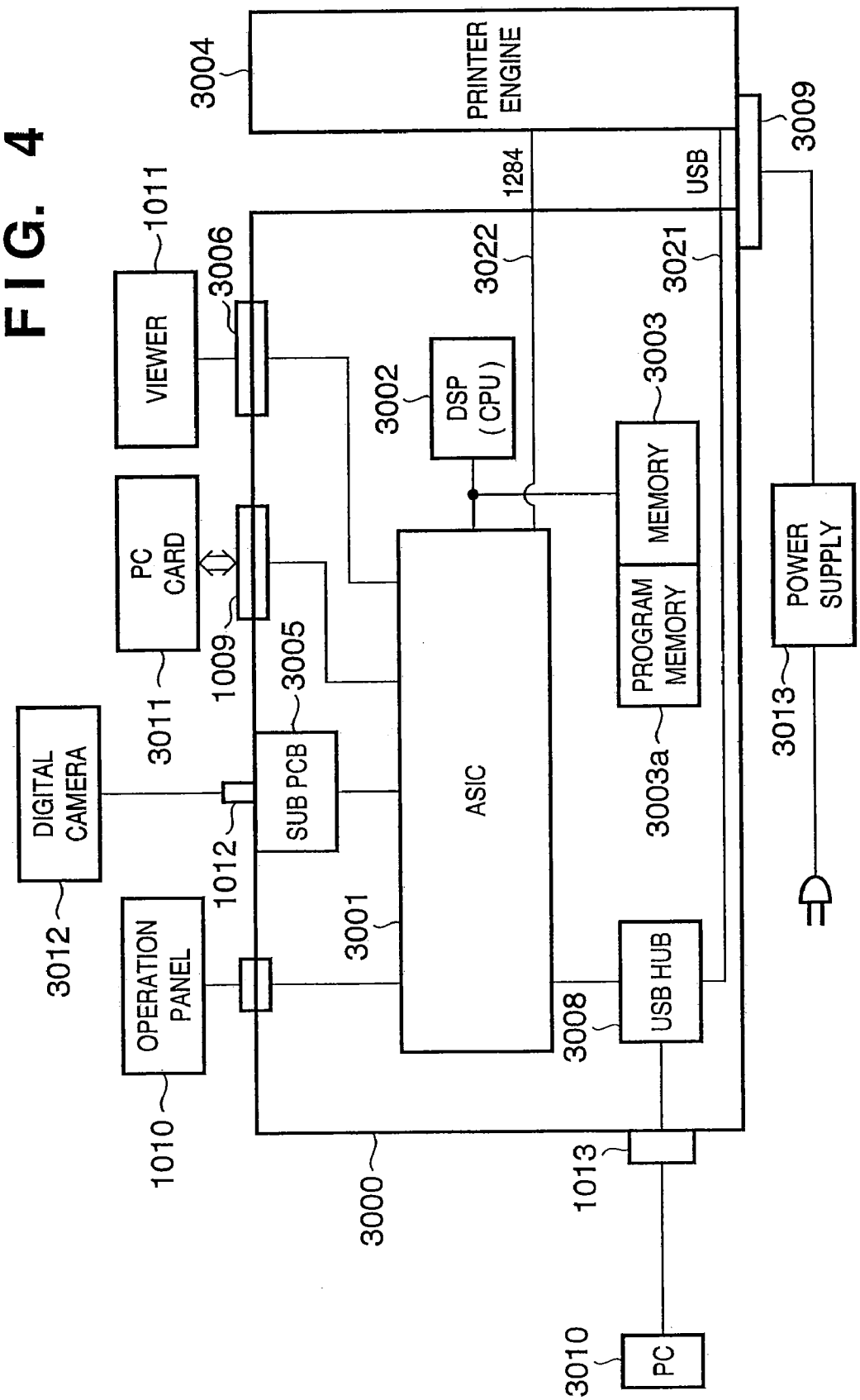
FIG. 4 is a block diagram showing the arrangement of the ASIC of the photo-direct printer apparatus according to the embodiment.

The arrangement of the main part concerning control of the photo-direct printer apparatus according to this embodiment will be explained with reference to FIG. 4. In FIG. 4, the same reference numerals as in the foregoing drawings denote the same parts, and a description thereof will be omitted.

In FIG. 4, reference numeral 3000 denotes a controller (control board); numeral 3001 denotes an ASIC (application specific LSI) whose arrangement will be described in detail below with reference to the block diagram of FIG. 4; numeral 3002 denotes a DSP (Digital Signal Processor) which incorporates a CPU and performs various control processes (to be described later), and image processes such as conversion from an RGB signal (RGB signal indicates three primary color signals for display and is called as a luminance signal) to a CMYK signal (CMY signal indicates three primary color signal for printing and a CMYK signal including a black signal is called as a density signal), scaling, gamma conversion, and error diffusion; numeral 3003 denotes a memory having a program memory 3003a which stores the control program of the CPU of the DSP 3002, a RAM area which stores variables and the like in executing a program, and a memory area functioning as a work memory which stores image data and various data; numeral 3004 denotes a printer engine which is an ink-jet print type printer engine for printing a color image by using a plurality of color inks in this embodiment; numeral 3005 denotes a connector serving as a port for connecting a digital camera 3012; numeral 3006 denotes a connector for connecting the viewer 1011; and numeral 3008 denotes a USB bus hub which transmits data from a PC 3010 and outputs the data to the printer engine 3004 via a USB bus 3021 when the printer apparatus 1000 performs printing based on image data from the PC 3010. The connected PC 3010 can directly exchange data and signals with the printer engine 3004 and execute printing (functions as a general PC printer). Reference numeral 3009 denotes a power connector which receives from a power supply 3013 a DC voltage converted from a commercial AC voltage. The PC 3010 is a general personal computer. Reference numeral 3011 denotes a memory card (PC card) described above; and 3012, the digital camera.

Signal exchange between the controller 3000 and the printer engine 3004 is performed via the USB bus 3021 or an IEEE 1284 bus 3022.

Figure 5:
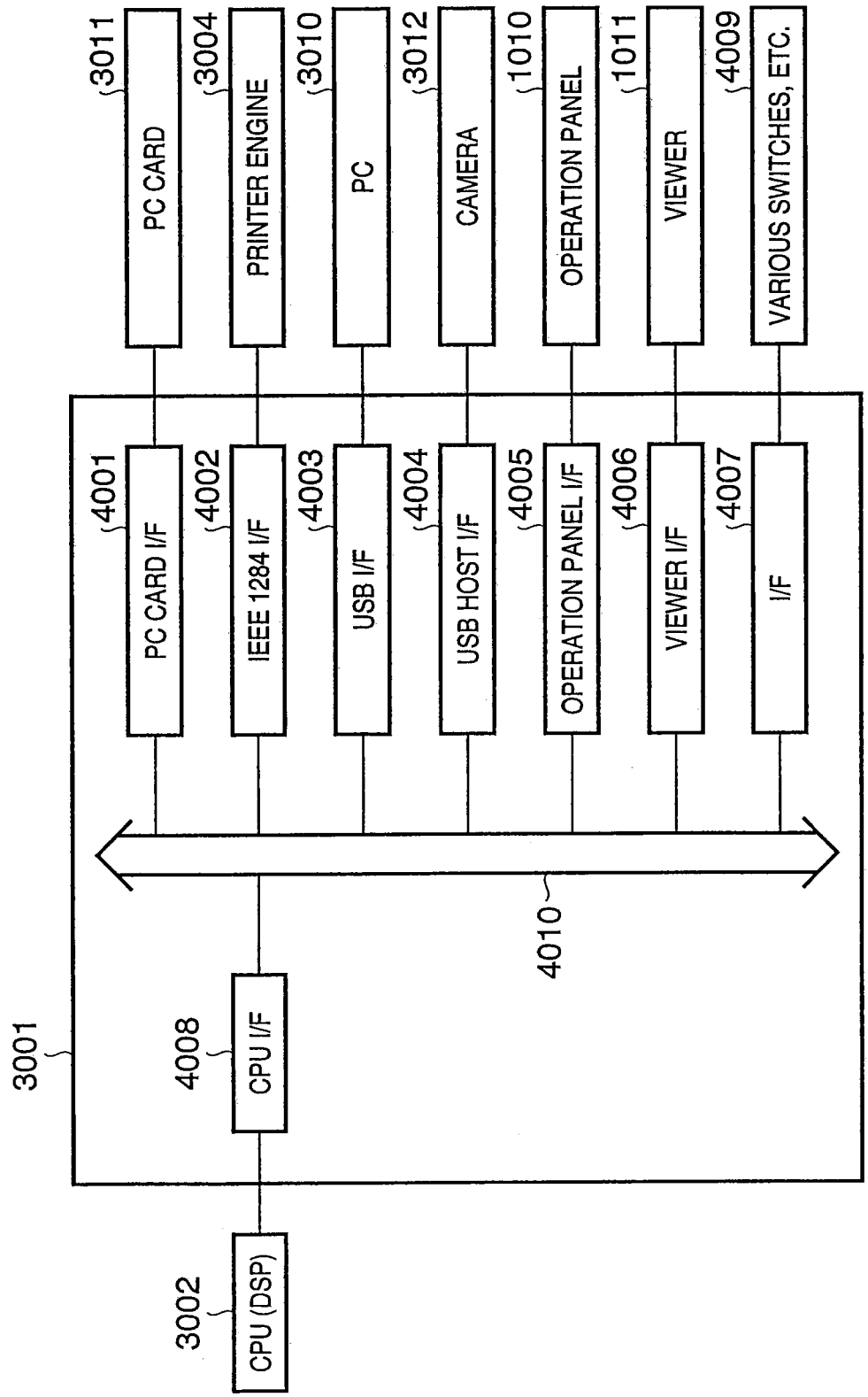
FIG. 5 depicts a view for explaining connection between the photo-direct printer apparatus and a digital camera according to the embodiment.

FIG. 5 is a block diagram mainly showing the arrangement of the ASIC 3001. Also in FIG. 5, the same reference numerals as in the foregoing drawings denote the same parts, and a description thereof will be omitted.

Reference numeral 4001 denotes a PC card interface which reads image data stored in the mounted PC card 3011 or writes data in the PC card 3011; and numeral 4002 denotes an IEEE 1284 interface which exchanges data with the printer engine 3004. The IEEE 1284 interface is a bus used to print image data stored in the digital camera 3012 or PC card 3011. Reference numeral 4003 denotes a USB interface which exchanges data with the PC 3010; numeral 4004 denotes a USB host interface which exchanges data with the digital camera 3012; numeral 4005 denotes an operation panel interface which receives various operation signals from the operation panel 1010 or outputs display data to the display 1006; numeral 4006 denotes a viewer interface which controls display of image data on the viewer 1011; numeral 4007 denotes an interface which controls an interface between various switches, an LED 4009, and the like; numeral 4008 denotes a CPU interface which controls data exchange between these interfaces and the DSP 3002; and numeral 4010 denotes an internal bus (ASIC bus) which is connected to these units. The DSP 3002 parallelly performs control of the photo-direct printer apparatus 1000 and image processing such as conversion from a luminance signal (RGB) to a density signal (CMYK), scaling, gamma conversion, and error diffusion. The control of the photo-direct printer apparatus 1000 includes processing of accessing the PC card 3011 and digital camera 3012 by controlling, e.g., the PC card I/F 4001 and USB host I/F 4004.

Figure 6:
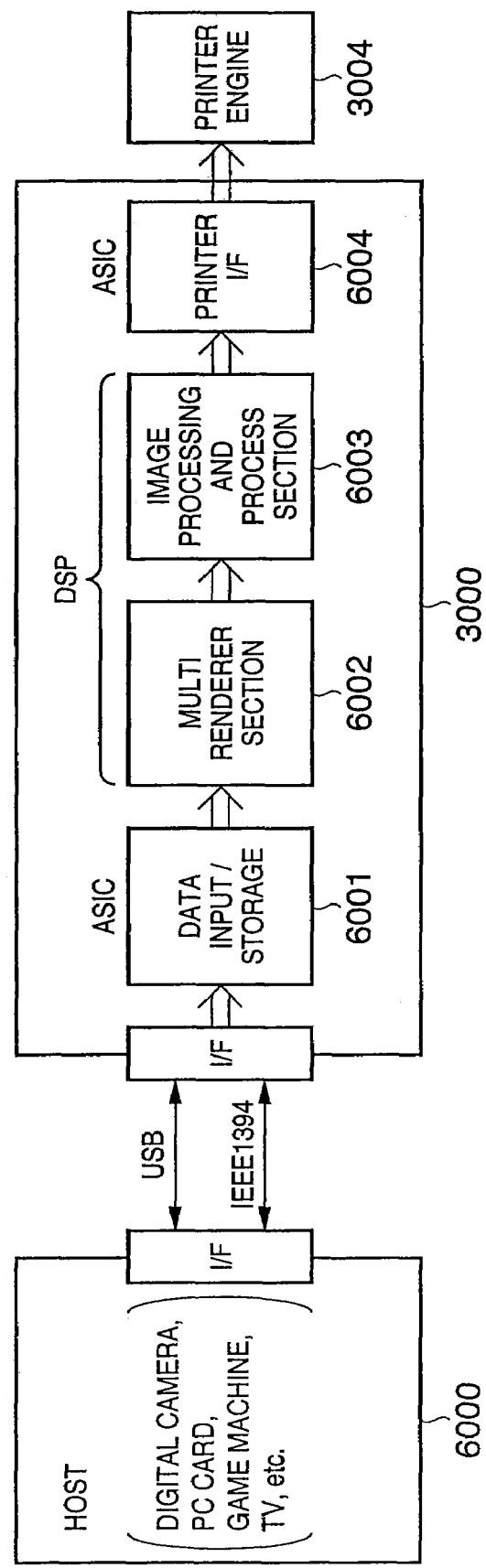
FIG. 6 is a functional block diagram showing interfaces and the arrangement of functions for image processing control of the photo-direct printer apparatus according to the embodiment.

FIG. 6 is a functional block diagram showing the interfaces and the arrangement of functions for image processing control of the photo-direct printer apparatus 1000 according to the embodiment. Also in FIG. 6, the same reference numerals as in the foregoing drawings denote the same parts, and a description thereof will be omitted.

Reference numeral 6000 corresponds to a host (image data source) when seen from the photo-direct printer apparatus 1000. The host 6000 includes the PC 3010 serving as the host computer, the digital camera 3012, and the PC card 3011 described above, and a game machine, television device (neither is shown), and the like. The host 6000 is connected via an interface such as a USB bus, IEEE 1284, or IEEE 1394. As the interface, Bluetooth or the like may be used.

The function of the control board 3000 described above further includes a data input/storage processor 6001 and a printer interface 6004 for outputting print data to the printer engine 3004, which are implemented by the ASIC 3001, and a multi-renderer section 6002 and image processing and process section 6003 executed by the DSP 3002.

Figure 7:
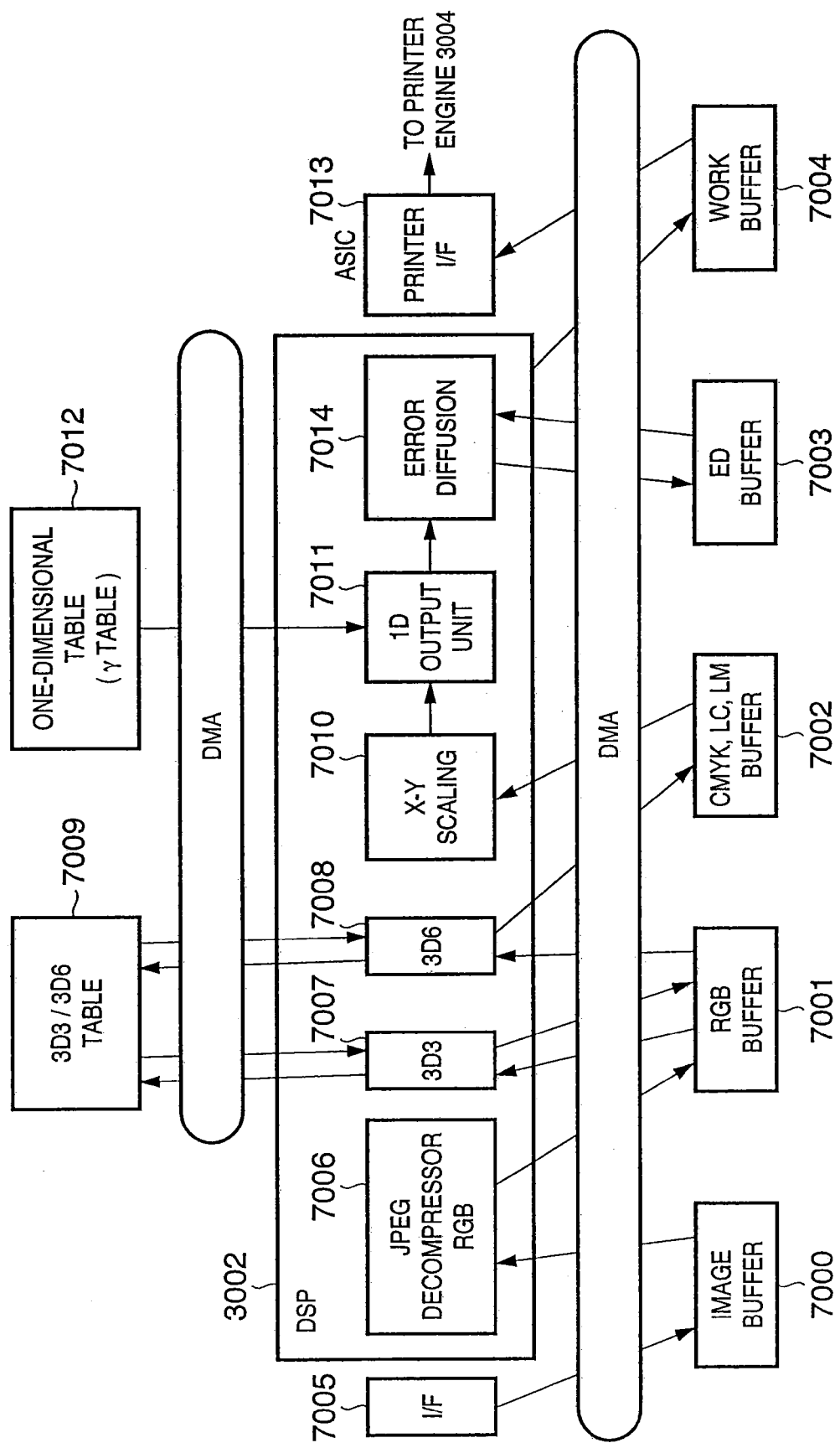
FIG. 7 is a functional block diagram showing the arrangement of the functions for image processing control of the photo-direct printer apparatus according to the embodiment in more detail.

FIG. 7 is a functional block diagram showing the arrangement of the functions for image processing control in the photo-direct printer apparatus 1000 according to the embodiment in more detail. Also in FIG. 7, the same reference numerals as in the foregoing drawings denote the same parts, and a description thereof will be omitted.

In FIG. 7, image data or JPEG-compressed image data input from the PC card 3011, camera 3012, or PC 3010 via an interface 7005 such as a USB bus interface is temporarily stored in an image buffer 7000. If the stored data is compressed data, it is decompressed in a JPEG decompressor 7006, the decompressed data is converted from Y, Cb, and Cr signals into R, G, and B signals, and the converted signal is then stored in an RGB buffer 7001. A 3D3 (7007) converts the color space of RGB data by looking up a look-up table 7009. A 3D6 (7008) converts R, G, and B signals into signals for six colors of C, M, Y, K, LC (light cyan), and LM (light magenta) by looking up the look-up table 7009. Reference numeral 7010 denotes an X-Y scaling unit which changes image sizes in the X and/or Y direction. Reference numeral 7011 denotes a 1D output unit which executes color processing such as γ conversion by looking up a one-dimensional table 7012. Reference numeral 7012 denotes an error diffusion (ED) unit which executes error diffusion processing for multilevel image data to generate binarized image data (or multilevel data) for each color. The binarized (or multilevel) image data generated in this manner is stored in an ED buffer 7003. Reference numeral 7004 denotes a work buffer which stores print data corresponding to each of a plurality of print heads discharging inks of respective colors. The generated print data corresponding to each print head is transmitted to the printer engine 3004 via a printer interface 7013, and printing is performed.

In FIG. 7, the X-Y scaling unit 7010 performs size change processing for an image in the X and/or Y direction after processing by the 3D6 (7008). However, the present invention is not limited to this, and as will be described later with reference to FIG. 11, the size change processing may be performed before color conversion to RGB data.

As described above, in the photo-direct printer apparatus 1000, the DSP 3002 executes control of each unit of the apparatus 1000 in addition to image processing. The DSP 3002 also has a parallel processing function and can parallelly execute the 3D3 processing, 3D6 processing, X-Y scaling, 1D output processing, error diffusion processing, and the like. The DSP 3002 is, e.g., TMS320DSP available from Texas Instruments (TI), which executes control (to be described later) in accordance with a control program stored in the program memory 3003a shown in FIG. 4.

Figure 8:
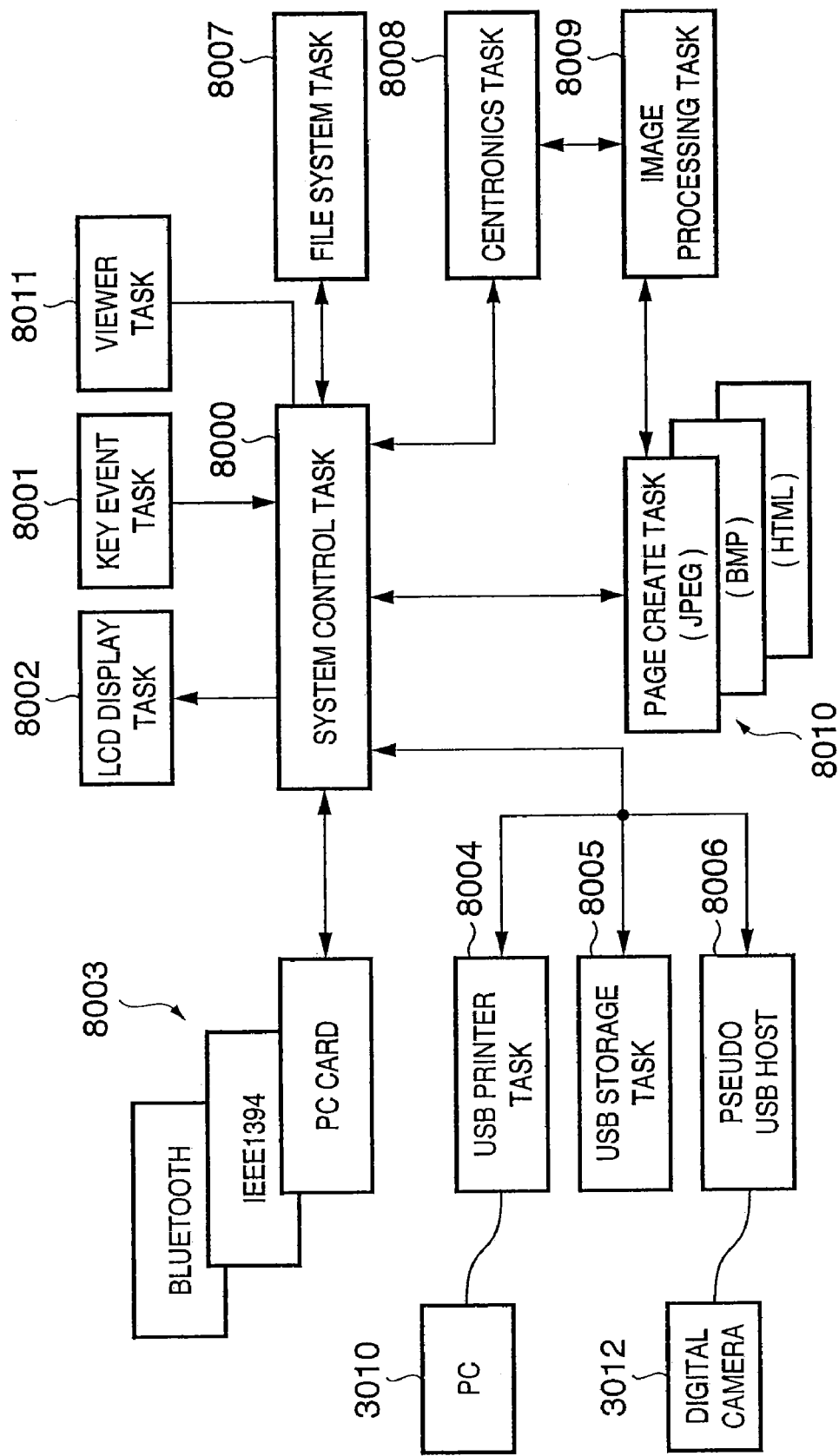
FIG. 8 is a block diagram showing a multitask structure in which a task is created for each functional module in a control program of the photo-direct printer apparatus according to the embodiment.

This control program is arranged in a multitask form in which a task is created for each functional module. FIG. 8 shows a main task structure.

In FIG. 8, reference numeral 8000 denotes a system control task which arbitrates an entire system, e.g., issues each event between tasks, controls a sequence at the end of an event, and performs exclusive processing. Reference numeral 8001 denotes a key event task 8001 which analyzes a pressed key on the basis of key operation in the operation panel 1010. Reference numeral 8002 denotes a display task for the LCD 1006, which is activated at the time when a UI control request, massage display request, or the like is made on the display 1006, and executes display control to the display 1006. Reference numeral 8003 denotes tasks activated by reading/writing data from/in the PC card 3011 or inputting/outputting to/from data via the IEEE 1304 or Bluetooth. Reference numeral 8004 denotes a USB printer task activated by data transfer from the PC 3010 connected via the USB bus. The USB printer task 8004 is activated by a printer interrupt sent via a USB bus and executes a function serving as a PC printer.

A USB storage task 8005 is activated by the system control task 8000 and initiates firmware. The USB storage task 8005 starts/ends a USB control task and USB bulk task which are lower tasks in accordance with a message from the system control task 8000. A pseudo USB host task 8006 is activated by the USB task and executes data read from the digital camera 3012 connected via a USB bus and various types of communication controls. Reference numeral 8007 denotes a file task which performs input/output control such as file open, file close, file read, and file write. Reference numeral 8008 denotes a task activated from a Centronics interface connected to the printer engine 3004. The task 8008 executes DMA transmission of print data, status reply, and the like. Reference numeral 8009 denotes an image processing task which receives RGB data, generates YMCK data by 3D processing, tetrahedron interpolation, color conversion, scaling, and error diffusion described above, and finally generates raster image data which is to be output to the printer engine 3004. Reference numeral 8010 denotes a page create task which expands JPEG data to convert it into image data, generates image data from data in a BMP format, or generates image data from an HTML document. In addition, the page create task 8010 performs image processing such as photograph data correction and grayscale correction and generates RGB data. Reference numeral 8011 denotes a viewer task which executes display control to the viewer 1011 when the viewer 1011 has been connected.

The outline of processing performed by the DSP 3002 of the photo-direct printer apparatus 1000 according to the embodiment will be described with reference to the flow charts in FIGS. 9 to 12. Note that since this processing by the DSP 3002 is executed in the multi-task, the flow of whole processing will be described here.

Figure 9:
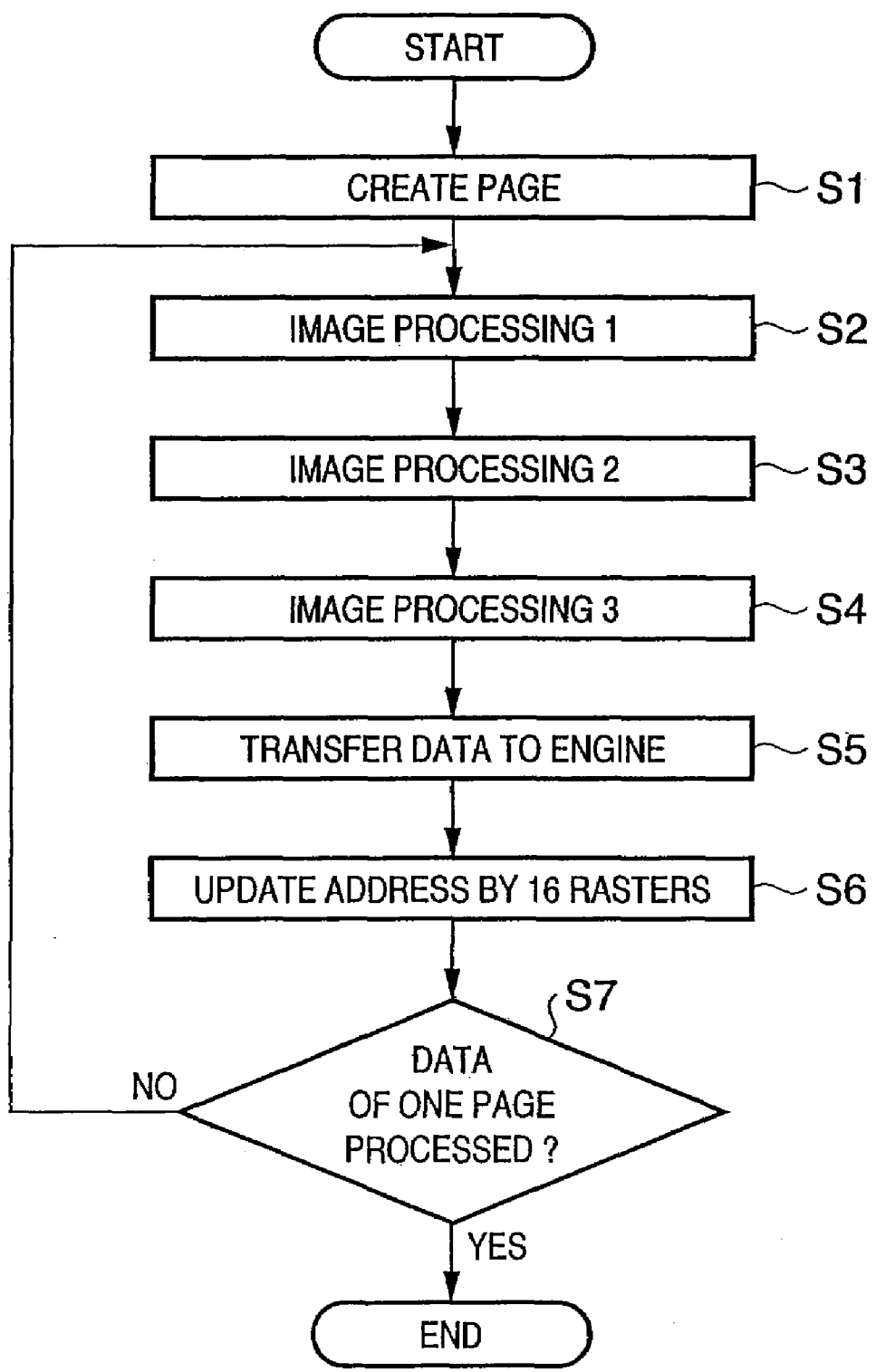
FIG. 9 is a flow chart schematically showing processing executed by a DSP according to the embodiment.

FIG. 9 is a flow chart showing the outline of processing performed by the DSP 3002 according to the embodiment.

This processing is started by receiving image data from the PC card 3011 or digital camera 3012 and inputting the received data. In step S1, the CPU performs page create processing. In the page create processing, the CPU sets the format of page data. The process proceeds to step S2 and the image processing 1 is executed. Then image processing 2 is executed in step S3, and image processing 3 is executed in step S4. The image processing 1 to image processing 3 will be described later with reference to FIGS. 10 to 12, which are executed in parallel. The processing unit of the image data to be processed herein is 16 rasters.

After image processing has ended and print data is generated, the process proceeds to step S5 and the generated print data is transferred to the printer engine 3004 by DMA. The process proceeds to step S6, in order to read out data to be processed next, the address of the image buffer 7000 is incremented by 16 rasters to update the address. The process proceeds to step S7, it is checked whether image data of one page has been processed. If NO in step S7, the process proceeds to step S2 to repeat the above processing. If YES in step S7, the CPU ends the processing.

Figure 10:
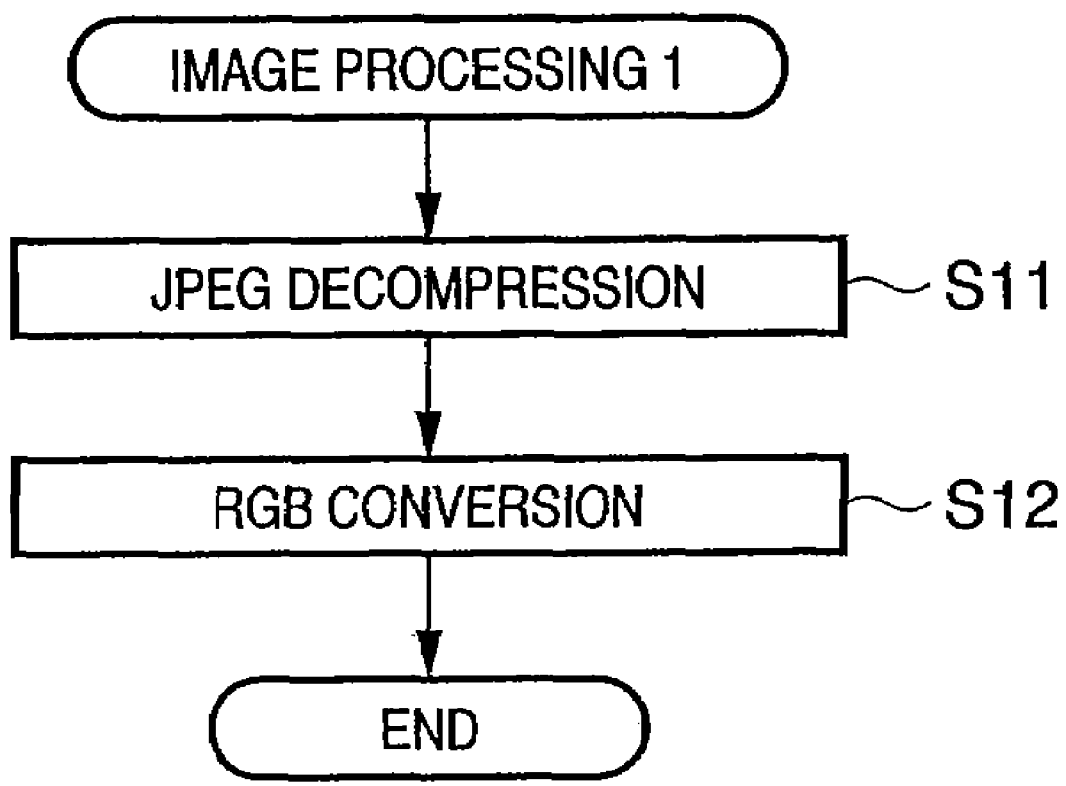
FIG. 10 is a flow chart for explaining image processing 1 in step S2 of FIG. 9.

FIG. 10 is a flow chart for explaining the image processing 1 in step S2 of FIG. 9.

In step S11, image data of the JPEG or TIFF format is decompressed. For example, in general decompression processing for JPEG data, decoding the Huffman code, inverse quantization, and inverse discrete cosine transformation are sequentially executed, resulting in generating Y, Cb, and Cr data. The process proceeds to step S12 and the Y, Cb, and Cr data are converted into R, G, and B data. This conversion is performed by using the conversion formula recommended by ITU-R BT. 601.

Figure 11:
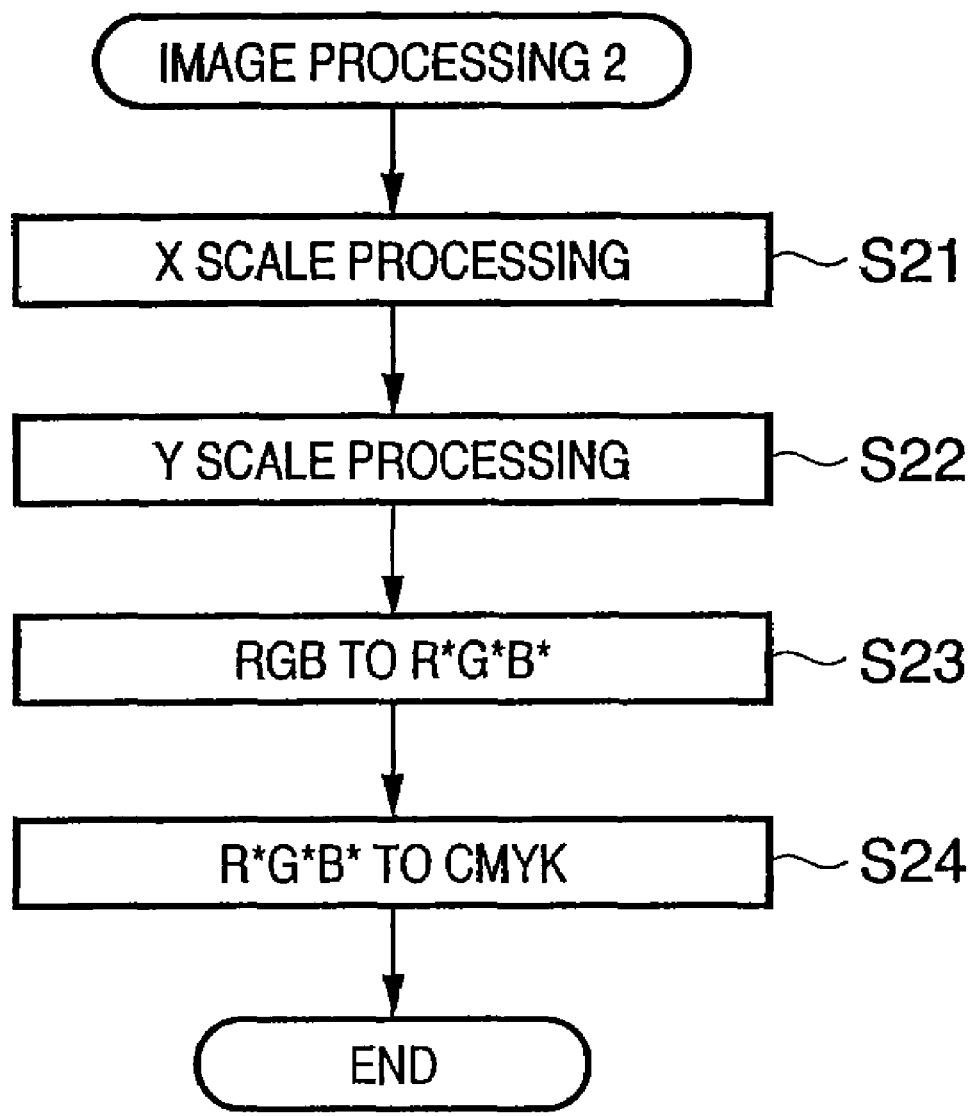
FIG. 11 is a flow chart for explaining image processing 2 in step S3 of FIG. 9.

FIG. 11 is a flow chart for explaining the image processing 2 in step S3 of FIG. 9.

In step S21, enlargement/reduction processing in the X direction (in this case, the X direction is a raster direction) is performed. The process proceeds to step S22 and enlargement/reduction processing in the Y direction (the Y direction is the nozzle array direction of the print head 1301) is performed. These processes are performed to enlarge/reduce an image by linear interpolation so as to match the image to an actual print region. The process proceeds to step S23 and RGB color components are converted into R*G*B* color components. In step S23, 8-bit R, G, and B data are respectively converted into 8-bit R*, G*, and B* data by using the three-dimensional look up table (LUT) 7009. This processing is called as color space conversion (color preprocessing), which is used for correcting the difference between the color space of an input image and a reproduction color space in the printer engine 3004. As shown in FIG. 18, in this color conversion, each color component is represented by, e.g., $$R^* = R \times C_0 + d_0$$

$$G^* = G \times C_1 + d_1$$

$$B^* = B \times C_2 + d_2$$

This calculation and processing for storing the calculation results in the memory 3003 are executed by the DSP 3002 in one instruction (note that these equations are used for explanation, and each of $C_0$, $C_1$, $C_2$, $d_0$, $d_1$, and $d_2$ is a predetermined constant).

In step S24, the RGB color components are converted into CMYK color components. In this processing, 8-bit R*, G*, and B* data obtained by the color space conversion are converted into six, i.e., 8-bit C, M, Y, K, LC, and LM data by using the three-dimensional LUT 7009. This processing is color conversion (called as color post-processing) in which the RGB colors of an input system are converted into the CMYK colors of an output system.

Such color conversion is performed because the additive three primary colors (RGB) of an illuminant such as a display in most cases are used for image data to be input, but the colorants of the subtractive three primary colors (CMY) are used when colors are represented by the reflection of light from the printer. The three-dimensional LUTs 7009 used in the color preprocessing and color post-processing hold data discretely, and values between the held data are obtained by interpolation. Such interpolation is well-known and a detailed description thereof will be omitted.

Figure 12:
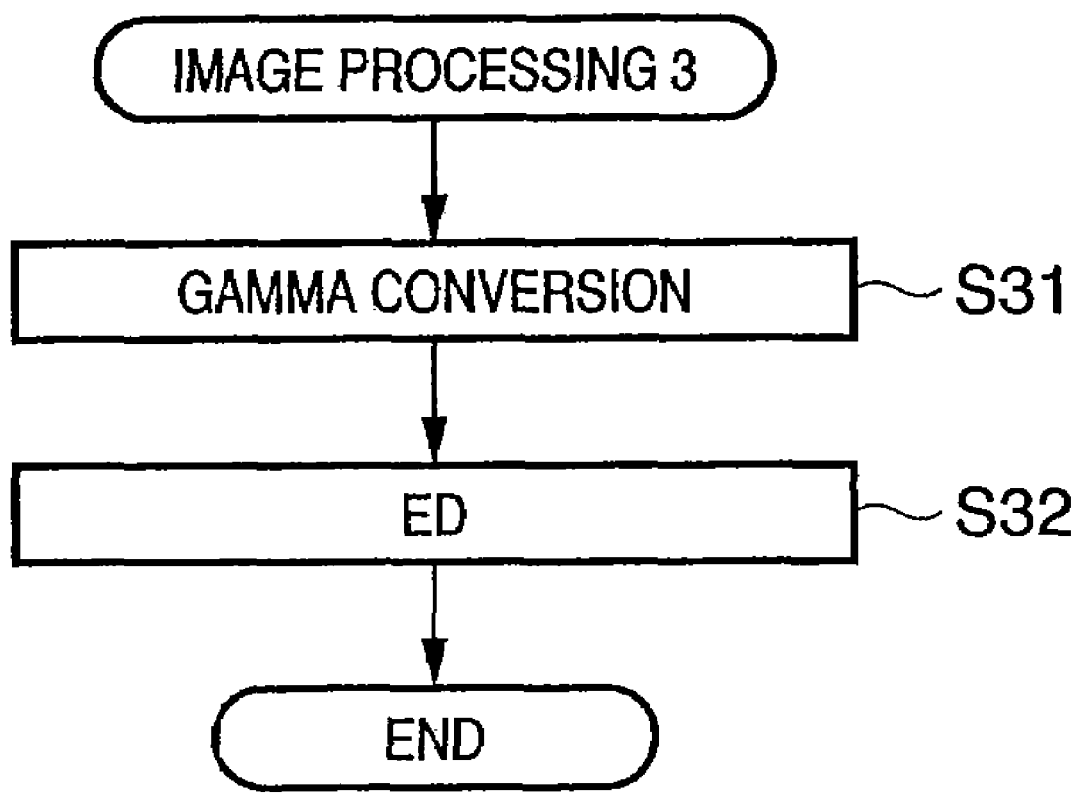
FIG. 12 is a flow chart for explaining image processing 3 in step S4 of FIG. 9.

FIG. 12 is a flow chart for explaining the image processing 3 in step S4 of FIG. 9.

In step S31, gamma conversion is performed to the C, M, Y, K, LC, and LM image data to adjust their densities. In this processing, the 8-bit C, M, Y, K, LC, and LM data undergo γ correction by using the one-dimensional LUT 7012. Since the relationship between output characteristics (reflection density and the like) and the number of print dots per unit area does not have any linear relationship in most cases, γ correction is performed to ensure the linear relationship between the input levels of the 8-bit C, M, Y, K, LC, and LM data and the corresponding output characteristics. If a detection means for detecting color misregistration in a print image detects the individual differences of the output characteristics of the print heads which print the respective colorants, color misregistration due to the individual differences can be prevented by changing data used for the γ correction in the one-dimensional LUT 7012. For example, if the output characteristic value of a print head which prints a C colorant is larger than an expectation value, the input/output relationship of the one-dimensional LUT 7012 is changed to reproduce a desired grayscale. This can realize individual difference correction for the print head in each apparatus.

The process proceeds to step S32 and binarization processing (error diffusion) is executed. The printer engine 3004 in this embodiment is used for a binary, ternary, or quaternary data printing apparatus (a case using a binary data printing apparatus will be described here) capable of smoothly representing a half-tone image like a photograph, in which 8-bit C, M, Y, K, LC, and LM image data are respectively quantized to 1- or 2-bit C, M, Y, K, LC, and LM data by the error diffusion method.

As shown in FIG. 19, an R color component is taken as an example. The DSP 3002 executes, in one instruction, processing of comparing the grayscale value of R with its threshold ("128" in this case) and processing for storing in the memory 3003 the results of two calculations of $R-D_0$ and $R-D_1$ performed to obtain the errors of compared values (where $D_0=0$, $D_1=255$). In accordance with the comparison results, a smaller one of the results of calculations of $R-D_0$ and $R-D_1$ is stored in the memory 3003. (If the grayscale value is equal to or smaller than "128", $R-D_0$ is stored as the error value, and if the grayscale value is larger than "128", $R-D_1$ is stored as the error value). Such a quantization method using the error diffusion method is well-known, and a detailed description will be omitted.

The outline of the operation based on the above arrangement will be described.

<General PC Printer Mode>

The general PC printer mode is a print mode in which an image is printed on the basis of print data from the PC 3010.

In this mode, when print data from the PC 3010 is input via the connector 1013, the print data is directly sent to the printer engine 3004 via the USB bus hub 3008 and USB bus 3021. Printing is executed based on the print data from the PC 3010.

<Direct Print Mode from PC Card>

When the PC card 3011 is mounted/dismounted in/from the card slot 1009, an interrupt occurs, and the DSP 3002 can detect mounting/dismounting (removal) of the PC card 3011. If the PC card 3011 is mounted, image data which is compressed (e.g., JPEG-compressed) and stored in the PC card 3011 is read out and stored in the memory 3003. The compressed image data is decompressed and stored in the memory 3003 again. If printing of the stored image data is designated on the operation panel 1010, conversion from an RGB signal to a YMCK signal, gamma correction, error diffusion, and the like are executed to convert the data into print data printable by the printer engine 3004. The resultant data is output to the printer engine 3004 via the IEEE 1284 interface 4002 to print the data.

<Direct Print Mode from Camera>

By connecting the photo-direct printer apparatus 1000 according to this embodiment and the digital camera 3012 via a cable, image data from the digital camera 3012 can be directly printed by the printer 1000.

In this case, the display 1006 of the operation panel 1010 displays only a camera mark 6000. The display and operation on the operation panel 1010 are invalidated, and display on the viewer 1011 is also invalidated. As subsequent operation, only key operation on the digital camera 3012 and image display on the display (not shown) of the digital camera 3012 are valid. The user can designate printing by using the digital camera 3012.

Processing in the photo-direct printer apparatus 1000 according to the embodiment based on the above arrangement will be explained with reference to flow charts shown in FIGS. 13 to 16. This processing is executed by multitask processing by the CPU of the DSP 3002.

Figure 13:
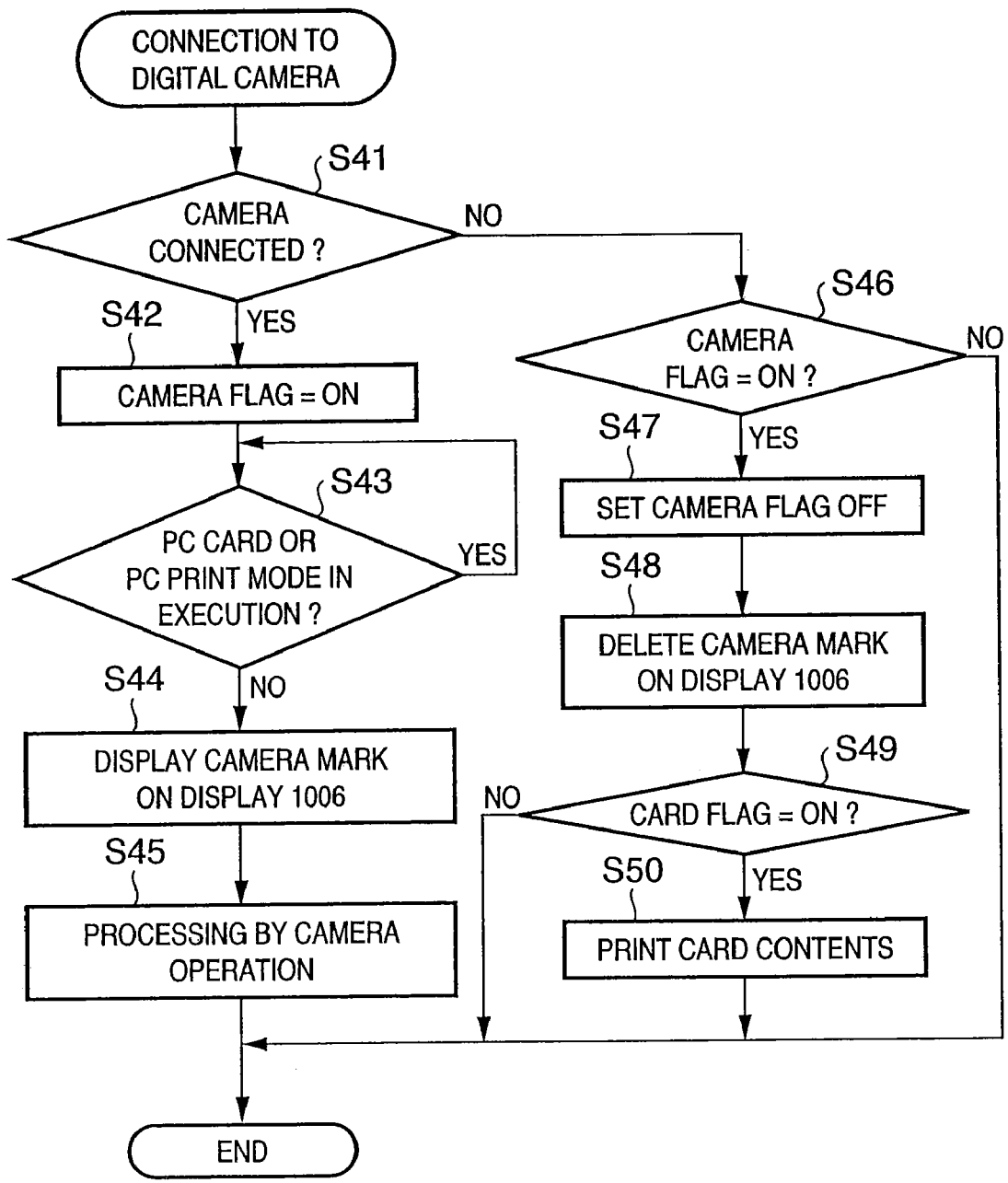
FIG. 13 is a flow chart showing processing when the photo-direct printer apparatus and digital camera according to the embodiment are connected.

FIG. 13 is a flow chart showing processing when the photo-direct printer apparatus 1000 and digital camera 3012 are connected.

In step S41, it is checked whether the digital camera 3012 has been connected to the USB bus by the USB host task. If YES in step S41, the process proceeds to step S42 and an "ON" camera flag is set in the memory 3003 to represent that the digital camera 3012 has been connected. The process proceeds to step S43 and it is checked whether the print mode by the PC card 3011 or the print mode based on data from the PC 3010 is being executed. If YES in step S43, the process waits until the end of the mode, and advances to step S44. The camera mark 6000 is displayed on the display 1006 of the operation panel 1010, and it notifies the user of connection of the digital camera 3012. The process advances to step S45, image data is received from the digital camera, and printed, in accordance with an operation instruction input from the operation unit of the digital camera 3012, an image which is sensed by the digital camera 3012 and stored in the storage medium of the camera 3012.

If the digital camera 3012 is not connected but its connection is canceled, i.e., the digital camera 3012 is disconnected in step S41, the process proceeds to step S46 and it is checked whether the camera flag is ON, i.e., whether the camera 3012 has been connected and is disconnected first. If YES in step S46, the process proceeds to step S47, the camera flag is set to OFF, and the camera mark 6000 displayed on the display 1006 is disappeared in step S48. The process proceeds to step S49 and it is checked whether a card flag representing mounting of the PC card 3011 is ON. If YES in step S49, the process advances to step S50 for read of image data from the PC card 3011 which has been invalid, and print processing of the readout image data. The process proceeds to these processes because read of image data from the PC card 3011 and its print processing may be suspend while the digital camera 3012 was connected. If NO in step S46 or S49, the process is ended.

Figure 14:
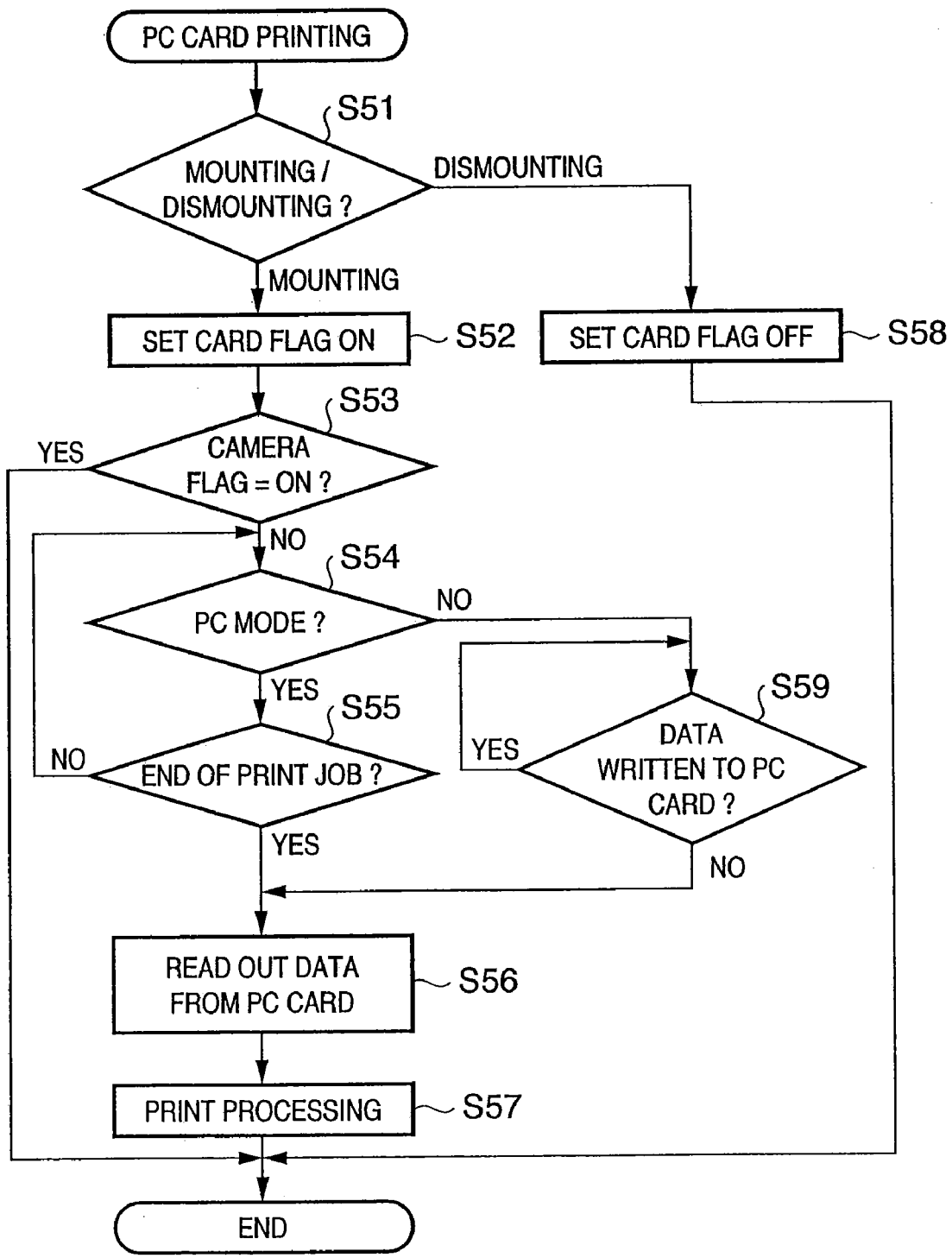
FIG. 14 is a flow chart for explaining processing along with mounting/dismounting of a PC card in the photo-direct printer apparatus according to the embodiment.

FIG. 14 is a flow chart for explaining print processing of PC card data along with mounting of the PC card 3011 or processing along with dismounting of the PC card 3011.

Mounting/dismounting of the PC card 3011 is detected by an interrupt. In step S51, it is checked whether the PC card 3011 is mounted or dismounted. If the PC card 3011 is mounted, the process proceeds to step S52 and an "ON" card flag representing that the PC card 3011 is mounted, is set. Then, the process advances to step S53 and it is whether the camera 3012 has been connected, based on the camera flag. If the camera flag is ON, the process is ended without receiving data.

If the camera flag is OFF, the process proceeds to step S54 and it is checked whether a print job is being executed in the PC mode, i.e., in accordance with a print instruction from the PC 3010. If NO in step S54, the process proceeds to step S59; if YES, to step S55, waits until the print job ends, and then advances to step S56. In step S59, it is checked whether the PC 3010 is writing data in the PC card 3011. If YES in step S59, the process waits until the end of write processing, and advances to step S56. In step S56, data is read out from the PC card 3011 in accordance with an operation instruction received from the operation panel 1010. In step S57, the readout image data is printed in accordance with an instruction from the operation panel 1010.

If the PC card 3011 is dismounted in step S51, the process proceeds to step S58, the card flag is set to OFF, and it is stored that the PC card 3011 is dismounted.

Figure 15:
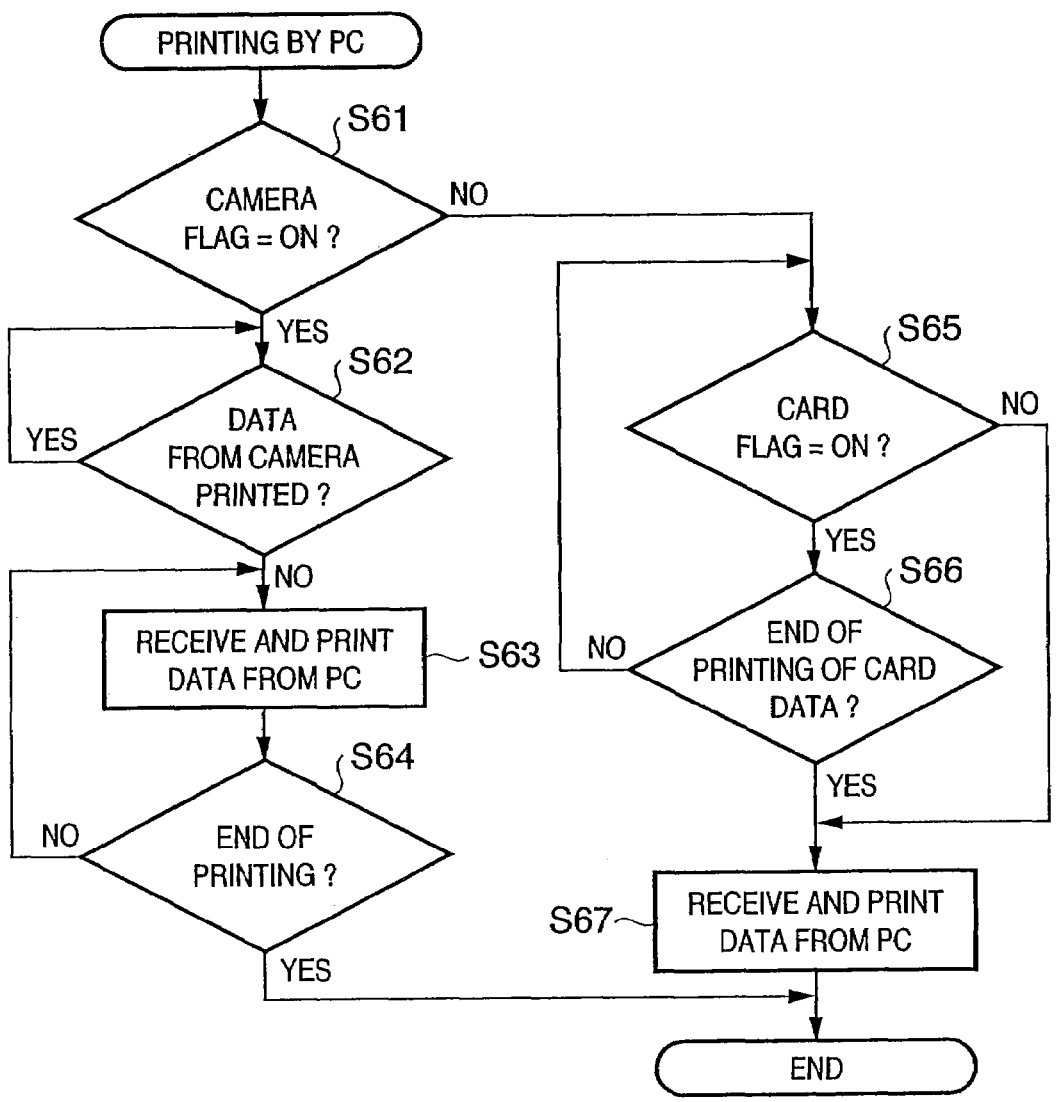
FIG. 15 is a flow chart for explaining processing of receiving and printing print data from a PC in the photo-direct printer apparatus according to the embodiment.

FIG. 15 is a flow chart for explaining processing of receiving and printing print data from the PC 3010.

Upon reception of print data from the PC 3010, in step S61, it is checked whether the camera flag is ON, i.e., the digital camera 3012 has been connected. If YES in step S61, the process advances to step S62, and it is checked whether data from the connected digital camera 3012 is printing. If NO in step S62, or data from the camera 3012 is being printed in step S62, the process waits until the end of the print processing, advances to step S63, and data is received from the PC 3010 to execute print processing. The process repeats the processing in steps S63 and S64 until print processing is ended in step S64. When printing of data from the PC 3010 ends, the process is ended while keeping ON the camera flag representing connection to the digital camera 3012 (keeping connection to the digital camera 3012).

If the camera flag is OFF (the camera 3012 is disconnected) in step S61, the process advances to step S65 and it is checked whether the card flag is ON, i.e., the PC card 3011 has been connected. If NO in step S65, the process proceeds to step S67; if YES, to step S66, and it is checked whether print processing of image data from the PC card 3011 is being executed. If NO in step S66, the process returns to step S65, and waits until printing of image data from the PC card 3011 ends. Then, the process proceeds from step S66 to step S67 and executes a general PC printer operation of receiving and printing image data sent from the PC 3010.

Figure 16:
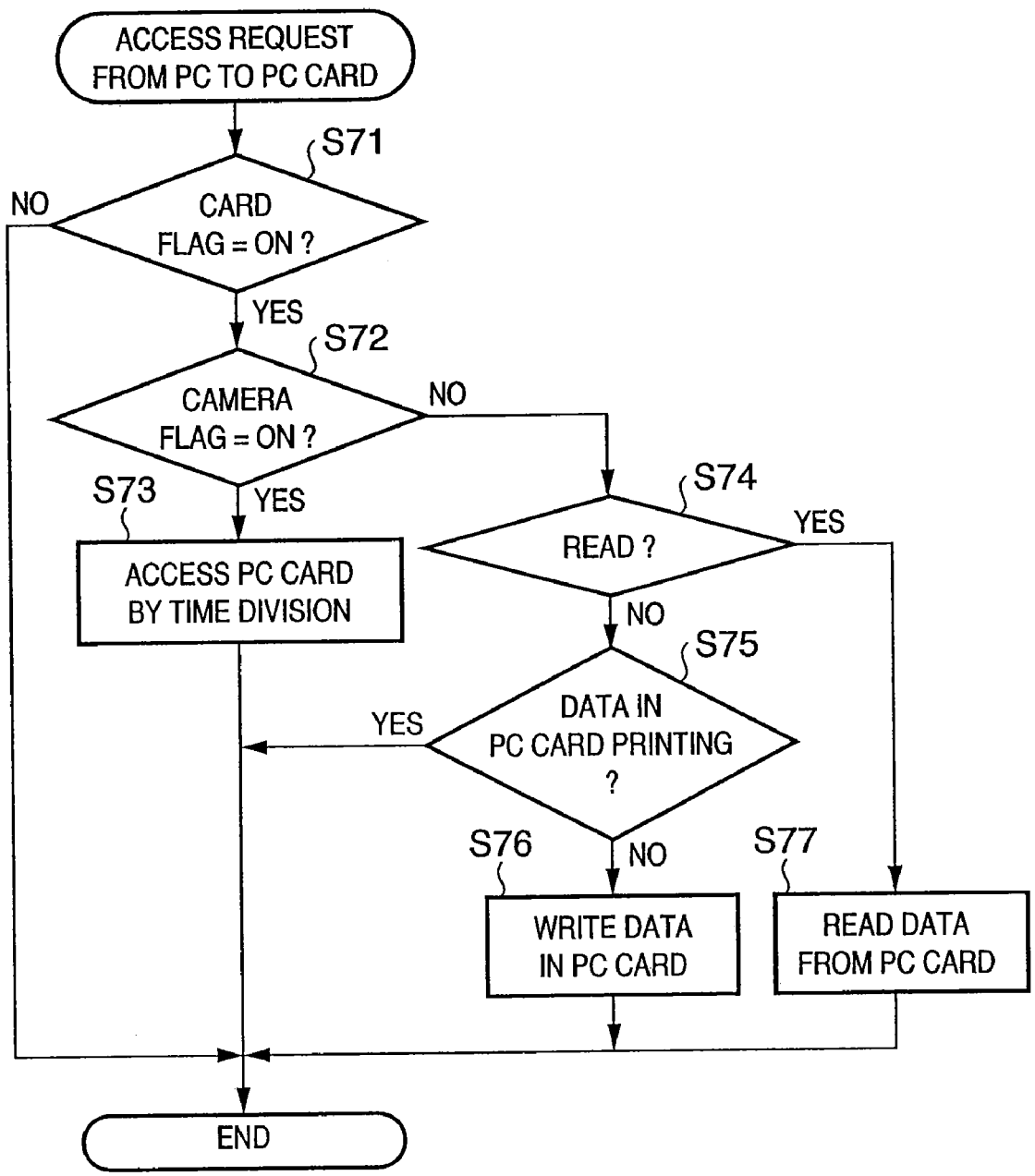
FIG. 16 is a flow chart for explaining access request processing from the PC to a PC card in the photo-direct printer apparatus according to the embodiment.

FIG. 16 is a flow chart showing access from the PC 3010 to the PC card 3011.

If an access request from the PC 3010 to the PC card 3011 is input, the process proceeds to step S71 and it is checked whether the card flag is ON. If NO in step S71, this means that the PC card 3011 is not mounted. The process notifies the PC 3010 of a message to this effect, and ends the processing. If YES in step S71, the process proceeds to step S72 and it is checked whether the camera flag is ON, i.e., the digital camera 3012 has been connected. If YES in step S72, the process proceeds to step S73, time-divides data exchange with the digital camera 3012, and permits access from the PC 3010 to the PC card 3011 by the divided time.

If NO in step S72, the process advances to step S74 and it is checked whether the PC 3010 outputs an instruction of designating readout of data from the PC card 3011. If YES in step S74, the process proceeds to step S77 and image data is read out from the PC card 3011. This is because readout of the contents of the PC card 3011 does not influence other processes which are being executed even while the contents of the PC card 3011 are being printed.

If the PC 3010 does not output an instruction of designating readout of data from the PC card 3011 in step S74, i.e., the PC 3010 outputs a data write instruction to the PC card 3011, the process proceeds to step S75 and it is checked whether data in the PC card 3011 is being printed. If YES in step S75, no contents in the PC card 3011 can be changed, and the process is ended. If NO in step S75, the process proceeds to step S76 and data writing operation of the PC card 3011 is executed in accordance with an access request from the PC 3010.

Thus, even while the digital camera 3012 is connected, the PC 3010 can access the PC card 3011.

Figure 17:
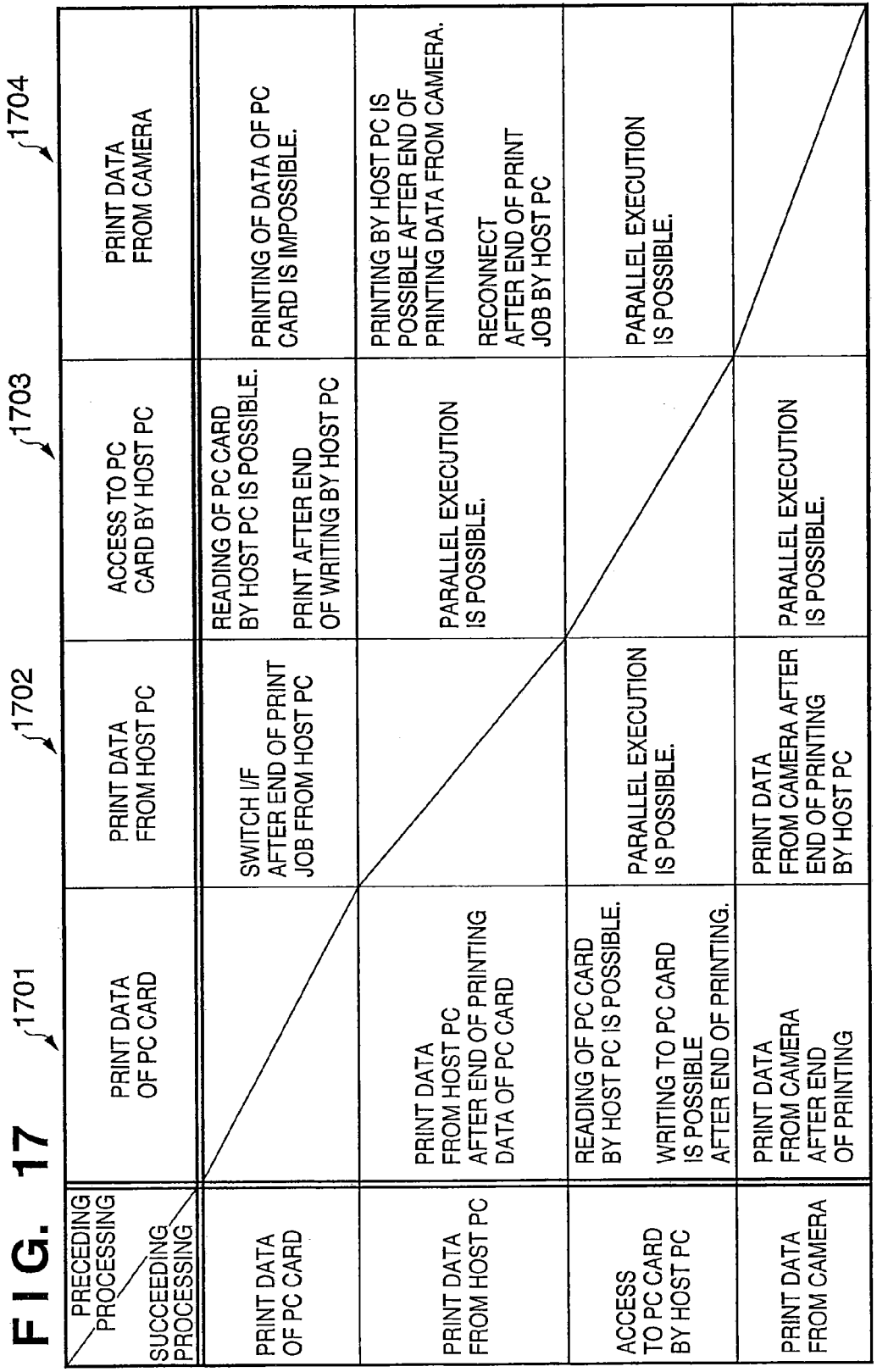
FIG. 17 is a table for explaining the relationship between the preceding processes and succeeding processes in the photo-direct printer apparatus according to the embodiment.

FIG. 17 is a table for explaining each state of processing succeeding the preceding processing, which is based on the above-described contents.

For example, referring to a column 1701, if a print instruction is received from the PC 3010 during printing the contents of the PC card 3011, the execution of print instruction is suspended until the end of print processing of data from the PC card 3011, and then print processing based on the print instruction from the PC 3010 is executed. If an access request from the PC 3010 to the PC card 3011 is received, the access request is executed if the access request is a read request. If the received request is a write request, the write processing based on the write request is suspended until the end of print processing of data from the PC card 3011, and then the write processing to the PC card based on the write request is executed. If the digital camera is connected during printing the contents of the PC card 3011, and a print instruction from the camera 3012 is received, the execution of print instruction is suspended until the end of print processing of data from the PC card 3011, and then the print processing based on the print instruction from the digital camera 3012 is executed.

Referring to a column 1702, if a print instruction for the contents of the PC card is received during printing based on data from the PC 3010, the execution of print instruction is suspended until the end of the print processing of the print data from the PC 3010, and then the print processing based on the data from the PC card 3011 is executed. If an access request from the PC 3010 to the PC card 3011 is received during print processing based on data from the PC 3010, the access request is parallelly executed. This is because the contents of the PC card 3011 are not being printed, and a change in contents of the PC card 3011 does not influence other processes. If a print instruction is received from the digital camera 3012 during printing based on data from the PC 3010, the print processing is suspended until the end of the print processing of data from the PC 3010, and then the print processing based on the print instruction from the digital camera 3012 is executed.

Referring to a column 1703, assume that a print instruction for the contents of the PC card 3011 is received during reading/writing data from/in the PC card 3011 on the basis of an access request from the PC 3010 to the PC card 3011. In this case, if the access request from the PC 3010 to the PC card 3011 is a read instruction, a print operation of the contents of the PC card 3011 is immediately executed. If, however, the access request from the PC 3010 to the PC card 3011 is a write instruction, the contents of the PC card 3011 are not printed as long as the write processing has been continued. If a print instruction from the PC 3010 is received while the PC 3010 accesses the PC card 3011, the access processing of the PC 3010 for the PC card 3011 and print processing based on data from the PC 3010 are parallelly executed. Similarly, if a print instruction from the digital camera 3012 is received during execution of an access request from the PC 3010 to the PC card 3011, the access processing of the PC 3010 for the PC card 3011 and print processing based on data from the digital camera 3012 are parallelly executed.

Referring to a column 1704, if a print instruction for the contents of the PC card is received during printing based on data from the digital camera 3012, this print instruction is ignored and not executed. If a print request from the PC 3010 is received during print processing based on data from the digital camera 3012, the print processing based on the data from the PC 3010 is executed after the print processing based on data from the digital camera 3012 ends. After the end of the print job based on the print request from the PC 3010, the connection to the digital camera 3012 is again enabled. If an access request from the PC 3010 to the PC card 3011 is received, the access request is executed. This is because the contents of the PC card 3011 are not being printed, and a change in contents of the PC card 3011 does not influence other processes. If an access request from the PC 3010 to the PC card 3011 is received during printing based on data from the digital camera 3012, the access request is executed. This is because the contents of the PC card 3011 are not being printed, and a change in contents of the PC card 3011 does not influence other processes.

In the above description, the top priority is given to digital camera operation when the digital camera is connected. For example, which of the digital camera, PC card, and PC is given the top priority may be arbitrarily set.

Alternatively, the top priority may be given to the digital camera as a default, and manually given to the PC card or PC by the user.

For example, a switch which always enables display on the viewer 1011 may be arranged, and even when the digital camera is connected, image data from the camera may be displayed on the viewer 1011. The switch for this setting may also be arranged on, e.g., the operation panel 1010, or may be another switch on the apparatus.

The present invention may be applied to a system constituted by a plurality of devices (e.g., a host computer, interface device, reader, and printer) or an apparatus (e.g., a copying machine or facsimile apparatus) formed from a single device.

The object of the present invention is also achieved when a storage medium (or recording medium) which stores software program codes for realizing the functions of the above-described embodiment is supplied to a system or apparatus, and the computer (or the CPU or MPU) of the system or apparatus reads out and executes the program codes stored in the storage medium. In this case, the program codes read out from the storage medium realize the functions of the above-described embodiment, and the storage medium which stores the program codes constitutes the present invention. The functions of the above-described embodiment are realized when the computer executes the readout program codes. Also, the functions of the above-described embodiment are realized when an OS (Operating System) running on the computer performs part or all of actual processing on the basis of the instructions of the program codes.

The functions of the above-described embodiment are also realized when the program codes read out from the storage medium are written in the memory of a function expansion card inserted into the computer or the memory of a function expansion unit connected to the computer, and the CPU of the function expansion card or function expansion unit performs part or all of actual processing on the basis of the instructions of the program codes.

As has been described above, according to the above-described embodiment, a printer apparatus which is connected to a PC, memory card, and digital camera, receives image data from them, and prints the image data can execute image processing at a high speed and perform printing.

In the above-described embodiment, a digital camera is exemplified as an image sensing apparatus, but the present invention is not limited to this. In recent years, for example, there is known a cell phone with a function of saving sensed or received image data. Such a cell phone may be connected via a connection cable, instead of a digital camera described in the embodiment.

As a portable information terminal, PDAs (Personal Digital Assistances) with a liquid crystal monitor capable of displaying an image and a memory capable of saving a sensed image are recently being available. Such a PDA may be connected to the printer apparatus via a connection cable, and may store image data saved in the PDA, similar to the digital camera of the above-described embodiment.

According to the photo-direct printer apparatus of this embodiment, one printer apparatus can implement the functions of a PC printer, camera printer, and memory printer.

The present invention is not limited to the above embodiments and various changes and modifications can be made within the spirit and scope of the present invention. Therefore, to apprise the public of the scope of the present invention, the following claims are made.

What is claimed is:

1. A recording apparatus comprising:
   recording means for recording an image on a recording medium on the basis of recording data;
   input means for inputting image data from an image data source;
   image processing means for decoding the image data inputted by said input means and executing image processing on the decoded image data to generate recording data; and
   control means for outputting the recording data to said recording means to record an image,
   wherein said image processing means comprises a digital signal processor and a memory, and the digital signal processor executes an arithmetic operation for color space conversion processing and binarization processing of one pixel unit and stores the result of the arithmetic operation into the memory, by one instruction,
   wherein in the binarization processing, the digital signal processor compares a gray scale value of the image data with a threshold value and subtracts the gray scale value from a predetermined value and stores the result of the subtraction into the memory in accordance with the comparison result, by one instruction, with respect to each color component of the image data.

2. The apparatus according to claim 1, wherein in the binarization processing, the digital signal processor executes plural operations of subtraction in parallel.

3. The apparatus according to claim 1, wherein during the color space conversion processing, the digital signal processor executes multiplication and adding processing and stores the results of the multiplication and adding processing into the memory, by one instruction.

4. A recording method comprising:
   an input step of inputting image data from an image data source;
   an image processing step of decoding the image data inputted in said input step and executing image processing on the decoded image data to generate recording data; and
   a recording step of recording an image on a recording medium on the basis of the recording data,
   wherein in said image processing step, any of color space conversion processing and binarization processing of one pixel unit are executed by one instruction of a digital signal processor, and in said image processing step, the digital signal processor compares a gray scale value of the image data with a threshold value and subtracts the gray scale value from a predetermined value and stores the result of the subtraction into a memory in accordance with the comparison result, by one instruction, with respect to each color component of the image data.

* * * * *